United States Patent
Schwalb

(10) Patent No.: US 7,028,331 B2
(45) Date of Patent: Apr. 11, 2006

(54) CONTENT PROXY METHOD AND APPARATUS FOR DIGITAL TELEVISION ENVIRONMENT

(75) Inventor: Eddie M. Schwalb, Irvine, CA (US)

(73) Assignee: Sharp Laboratories, Inc., Camas, WA (US)

( * ) Notice: Subject to any disclaimer, the term of this patent is extended or adjusted under 35 U.S.C. 154(b) by 1118 days.

(21) Appl. No.: 09/795,720

(22) Filed: Feb. 28, 2001

(65) Prior Publication Data

US 2002/0120790 A1 Aug. 29, 2002

(51) Int. Cl.
- *H04N 7/16* (2006.01)
- *H04N 9/44* (2006.01)
- *H04N 9/46* (2006.01)
- *H04N 13/00* (2006.01)
- *G06F 3/00* (2006.01)

(52) U.S. Cl. ............... 725/140; 725/132; 725/136; 725/152; 719/328

(58) Field of Classification Search ........... 725/132, 725/135, 136, 140, 141, 151, 152; 719/328; 709/218, 220, 234; 712/19; 713/200
See application file for complete search history.

(56) References Cited

U.S. PATENT DOCUMENTS

| | | | | |
|---|---|---|---|---|
| 6,065,058 | A | 5/2000 | Hailpern et al. | 709/231 |
| RE36,801 | E | 8/2000 | Logan et al. | 348/571 |
| 6,101,549 | A | 8/2000 | Baugher et al. | 703/238 |
| 6,118,931 | A | 9/2000 | Bopardikar | 386/125 |
| 6,119,167 | A | 9/2000 | Boyle et al. | 709/234 |
| 6,119,174 | A | 9/2000 | Borowsky et al. | 710/15 |
| 2001/0014210 | A1* | 8/2001 | Kang | 386/96 |

OTHER PUBLICATIONS

Programming the Web: The W3C DOM Specification (Lauren Wood; Jan.- Feb. 1999; 1089-7801/99/IEEE).*

TUAM 1.3; DASE: The data Applications Software Environment For DTV Data Broadcasting; (Aninda DasGupta; Philips Electronics; 0-7803-5123-1/99IEEE).*

(Continued)

*Primary Examiner*—Hai Tran
(74) *Attorney, Agent, or Firm*—Michael F. Krieger; Kirton & McConkie

(57) ABSTRACT

The present invention describes and claims a new system and technique or method for decoupling the interpretation of broadcast content information from the display of this information. The information may exist in any of the available types, such as audio, video, or data. In addition, the information may be received in any form, such as streaming or non-streaming, combinations of the two, or even parts thereof. The decoupling and encapsulating of the broadcast content information is accomplished using a content proxy. All content information in the content proxy is accessed via an Application Program Interface. The content proxy employs a hierarchical Document Object Model (DOM) that contains Program and System Information Protocol ("PSIP") data, that has been converted to an eXtendible Markup Language format using a conversion algorithm, broadcast content data, as well as content data or information about all of the hardware, software, and appliances connected within the networked environment. The proxy concept is applicable to the design and implementation of a Digital TV broadcast rendering device within a Digital TV Application Software Environment framework.

73 Claims, 16 Drawing Sheets

OTHER PUBLICATIONS

An Intergrated DTV Receiver for ATSC Digital Television Standard (Kenji Tsunashima etal.; Mitsubishi electric Corporation, Kyoto, Japan) and (Viktor Sinyanskly; Mitsubishi electric Information technology Center America, New Providence, NJ); 0098 3063/98.*

NIST Reference Platform and API Implementation; Robert Snelick (NIST- "DASE 2000 Slides"@ www.itl.nist.gov/div895/cmr/dase/download.html.*

DASE Symposium 2000 (NIST May 23-24, 2000)@www.itl.nist.gov/div895/cmr/dase/download.html.*

* cited by examiner

```xml
<Root_Element>
  <PAT>
    <transport_stream_d>0x100</transport_stream_d>
    <section_number>0x0</section_number>
    <last_section_number>0x0</last_section_number>
    <number0:Program>0x5</numberOfProgram>
<PAT>
<PMT>
    ATSCProgramMapping>
      <program_number>0x8</program_number>
      <PCR_PIO>0x100</PCR_PIO>
      <version_number>0x13</version_number>
      <ProgramElement>
        <stream_type>0x2</stream_type>
        <elementary_PIO>0x100</elementary_PIO>
      </ProgramElement>
      <ProgramElement.d='0x1'>
        <stream_type>0x81</stream_type>
        <elementary_PIO>0x200</elementary_PIO>
      </ProgramElement>
    </ATSCProgramMapping>
</PMT>
<MGT>
    <tables_defined>0xa</tables_defined>
    <parseMGTSection>available</parseMGTSection>
    <be_CRC>0x0</be4_CRC>
    <descriptors_length>0x0</descriptors_length>
    <version_number>0x0</version_number>
    <ATSCMasterGuideTableEntry :d='0x0'>
       <table_type>0x2</table_type>
       <table_PIO>0x1nb</table_PIO>

<table_type_version_number>0x2</table_type_version_number>
       <number_bytes>0x50</number_bytes>
    </ATSCMasterGuideTableEntry>
    <ATSCMasterGuideTableEntry:d='0x1'>
       <table_type>0x100</table_type>
       <table_PIO>0x1fd0</table_PIO>
```

Fig. 5A

```xml
    <table_type_version_number>0x3</table_type_version_number>
        <number_bytes>0x20a</number_bytes>
    </ATSCMasterGuideTableEntry>
</MGT>
<CVCT>
    <ATSCByteParser>available</ATSCByteParser>
    <be4_CRC>0x0</be4_CRC>
    <descriptor_length>0x0</descriptor_length>
    <version_number>0x4</version_number>
    <ATSCVirtualChannel>
        <short_name>TNT</short_name>
        <major_channel_number>0x1</major_channel_number>
        <minor_channel_number>0x1</minor_channel_number>
        <modulation_mode>0x2</modulation_mode>
        <carner_frequency>0xe12a170</carner_frequency>
        <channel_TSIO>0x6</channel_TSIO>
        <program_number>0x8</program_number>
        <EMT_location>0X1</EMT_location>
        <access_controlled>false</access_controlled>
        <hidden>false</hidden>
        <path_select>false</path_select>
        <out_of_band>false<out_of_band>
        <service_type_>0x2</service_type>
        <source_id>0x1</source_id>
        <EITSection>
            <num_events_in_section>0x3</num_events_in_section>
            <ATSCEventinformation>
                <event_id>0xcb</event_id>
                <start_time>0x25 o090</start_time>
                <ETM_location>0x1</ETM_location>
                <length_in_seconds>0x10</length_in_seconds>
                <title_text id ='0x0'>Wild.Wild West</title_text>
                <ATSCExtendedTextMessage>
                    <nature>event</nature>
                    <source_id>0x1</source_id>
                    <event_id>0xcb</event_id>
                    <version_number/>
                    <extended_text_message id='0x0'>The Night of the
Green Terror-Or Loveless drives Indians into poverty so he can
become their benefactor and deity.  Series
Classic/Adventure</extended_text_message>
                </ATSCExtendedTextMessage>
            </ATSCEventinformation>
            <ATSCEventinformation>
                <event_id>0xcc</event_id>
                <start_times>0x25tepea0</start_time>
                <ETM_location>0x;</ETM_location>
                <length_in_seconds>0xe10</length_in_seconds>
```

Fig. 5B

```
            <title_text_id='0x0'>The Adventures of Brisco County
Jr.</title_text
            <ATSCExtendedTextMessage>
             <nature>event</nature>
             <source_d>0x1</source_d>
             <event_d>0xcc</event_d>
             <extended_text_message_id='0x0'>No Man's Land.
Brisco and a professor (Bruce Campbell.John Ason) encounter 1
town exclusively for women.CC.Stereo.
Series/Adventure</extended_text_message>
            <version_number>0x7</version_number>
            </ATSCExtendedTextMessage>
           </ATSCEventInformation>
           </ATSCEventInformation>
             <event_d>0xcd</event_d>
             <start_time>0x25tecco0</start_time>
             <ETM_location>0x1</ETM_location>
             <length_in_seconds>0xe10</length_in_seconds>
             <title_text id='0x0'>Oue South</title_text>
             <ATSCExtendedTextMessage>
              <nature>event</nature>
              <source_id>0x1</source_id>
              <event_id>0xcd</event_id>
              <extended_text_message id='0x0'>Dead Men Don't
Throw Rice-A murder for hire business has a unique body disposal
system. CC.Stereo.-Series/Drama</extenden_text_message>
             <version_number>0x7</version_number>
             </ATSCExtendedTextMessage>
           </ATSCEventInformation>
           <version_number>0x7</version_number>
          </EITSection>
          <EITSection>
           <num_events_in_section>0x2</num_events_in_section>
           <version_number>0x7</version_number>
           <ATSCEventInformation>
            <source_id>0x1</source_id>
            <event_id>0xce</event_id>
            <start_time>0x25tecco0</start_time>
            <ETM_location>0x1</ETM_location>
            <length_in_seconds>0x1c20</length_in_seconds>
            <title_text id='0x0'>Secret Weapons(1985)
```

Fig. 5C

```xml
(NR)</title_text>
        <ATSCContentAdvisoryDescriptor id='0x0'>
           <descriptor_tag>0x87/descriptor_tag>
           <descriptorBaseLength>0x6</descriptorBaseLength>
           <rating_region_count>0x1</rating_region_count>
           <rating_region id='0x0'>
             <rating_region>0x1</rating_region>
             <rated_dimensions>0x1</rated_dimensions>
             <rated_dimension id='0x0'>
               <rating_dimension_j>0x0</rating_dimension_j>
               <rating_value>0x6</rating_value>
             <rated_dimension>
             <rating_description_text>
id='0x0'>null</rating_description_text>
           </rating_region>
        </ATSCContentAdvisoryDescriptor>
      </ATSCEventInformation>
      <ATSCEventInformation>
         <event_id>0xc:</event_id>
         <start_time>0x25tecco0</start_time>
         <ETM_location>0x1</ETM_location>
         <length_in_seconds>0x1c20</length_in_seconds>
         <title_text id='0x0'>Lethal Charm (1991) **
(NR)</title_text>
        <ATSCContentAdvisoryDescriptor id='0x0'>
           <descriptor_tag>0x87/descriptor_tag>
           <descriptorBaseLength>0x6</descriptorBaseLength>
           <rating_region_count>0x1</rating_region_count>
           <rating_region id='0x1'>
             <rating_region>0x1</rating_region>
             <rated_dimensions>0x1</rated_dimensions>
             <rated_dimensions id='0x0'>
               <rating_dimension_j>0x0</rating_dimension_j>
               <rating_value>0x6</rating_value>
             <rated_dimension>
             <rating_description_text>
id='0x0'>null</rating_description_text>
           </rating_region>
        </ATSCContentAdvisoryDescriptor>
      </ATSCExtendedTextMessage>
         <nature>event</nature>
         <extended_text_message id='0x0'>A White House
correspondent wants to be network TV anchorwoman: so does her
dangerous new friend. Directed by Richard Michaels. With: Barbara
Eden, Heather Locklear, Stuart Wilson, Julie Fulton, David James
Elliot, Ted Ailen, Gloria Henry, Tom Klunis, Eric Konner, Allan
Miller. Movies/Drama</extended_text_message>
```

Fig. 5D

```
            </ATSCExtendedTextMessage>
          </ATSCEventInformation>
        </EIT Section>
        <EIT Section source _ id='0x1'>
          <num_events_in_section>0x1</num_events_in_section>
          <ATSCEventInformation>
            <source_id>0x1 </source_id>
            <event_id>0xct</event_id>
            <start_time>0x25tecco0</start_time>
            <ETM_location>0x1</ETM_location>
            <length_in_seconds>0x1c20</length_in_seconds>
            <title_text id='0x0'>Lethal Charm (1991)
(NR)</title_text>
            <ATSCContentAdvisoryDescriptor id='0x0'>
              <descriptor_tag>0x87/descriptor_tag>
              <descriptorBaseLength>0x6</descriptorBaseLength>
              <rating_region_count>0x1</rating_region_count>
              <rating_region id='0x1'>
                <rating_region>0x1</rating_region>
                <rated_dimensions>0x1</rated_dimensions>
                <rated_dimensions id='0x0'>
                  <rating_dimensions_/>0x0</rating_dimensions_/>
                  <rating_value>0x6</rating_value>
                <rated_dimension>
                <rating_description_text>
id='0x0'>null</rating_description_text>
              </rating_region>
            </ATSCContentAdvisoryDescriptor>
          </ATSCEventInformation>
          <version_number>0x7</version_number>
        </EIT Section>
        <EIT Section source _ id='0x1'>
          <num_events_in_section>0x1</num_events_in_section>
          <ATSCEventInformation>
            <source_id>0x1 </source_id>
            <event_id>0xd0</event_id>
            <start_time>0x25tecco0</start_time>
            <ETM_location>0x1</ETM_location>
            <length_in_seconds>0x1c20</length_in_seconds>
            <title_text id='0x0'>The Sitter (1991) **(NR)</title_text>
            <ATSCContentAdvisoryDescriptor id='0x0'>
              <descriptor_tag>0x87/descriptor_tag>
              <descriptorBaseLength>0x6</descriptorBaseLength>
```

Fig. 5E

```xml
        <rating_region_count>0x1</rating_region_count>
        <rating_region id='0x1'>
          <rating_region>0x1</rating_region>
          <rated_dimensions>0x1</rated_dimensions>
          <rated_dimensions id='0x0'>
            <rating_dimensions_/>0x0</rating_dimensions_/>
            <rating_value>0x6</rating_value>
          <rated_dimension>
          <rating_description_text>
id='0x0'>null</rating_description_text>
        </rating_region>
      </ATSCContentAdvisoryDescriptor>
    </ATSCEventInformation>
    <version_number>0x7</version_number>
  </EIT Section>
  <EIT Section source _ id='0x1'>
    <num_events_in_section>0x1</num_events_in_section>
    <ATSCEventInformation>
      <source_id>0x1 </source_id>
      <event_id>0xd0</event_id>
      <start_time>0x25tecco0</start_time>
      <ETM_location>0x1</ETM_location>
      <length_in_seconds>0x1c20</length_in_seconds>
      <title_text id='0x0'>Burned Secrets (1996) **
(NR)</title_text>
      <ATSCContentAdvisoryDescriptor id='0x0'>
        <descriptor_tag>0x87/descriptor_tag>
        <descriptorBaseLength>0x6</descriptorBaseLength>
        <rating_region_count>0x1</rating_region_count>
        <rating_region id='0x0'>
          <rating_region>0x1</rating_region>
          <rated_dimensions>0x1</rated_dimensions>
          <rated_dimensions id='0x0'>
            <rating_dimensions_/>0x0</rating_dimensions_/>
            <rating_value>0x6</rating_value>
          <rated_dimension>
          <rating_description_text>
id='0x0'>null</rating_description_text>
        </rating_region>
      </ATSCContentAdvisoryDescriptor>
    </ATSCExtendedTextMessage>
      <nature>event</nature>
```

Fig. 5F

CONTENT PROXY METHOD AND APPARATUS FOR DIGITAL TELEVISION ENVIRONMENT

BACKGROUND

1. Field of the Invention

The present invention relates to Digital TV and was developed in the context of the Digital TV Application Software Environment (DASE), also known as ATSC/S17. It presents a new method and apparatus for decoupling the TV display presentation from real-time broadcasted audio, video, and data, both streaming (i.e., live) and non-streaming (i.e., recorded) signals.

2. Background

Displaying a Digital TV broadcast requires assembly and fusion of data from numerous sources. In particular, using prior art techniques, each combination of streaming and non-streaming video, audio, and data requires creating and adapting scenario specific code. For example, to synchronize the display of streaming (i.e. live) video with streaming data, such as is commonly found in financial news broadcasts as analysts' interviews are presented simultaneously with stock ticker symbols, software code must be developed that anticipates such a combination.

Synchronization of the above combination is significantly different than with other combinations, such as synchronizing the display of non-streaming (i.e. recorded) video with streaming data. In this instance, an entirely separate data structure must be created containing software code that enables the simultaneous viewing of such information. An example of where non-streaming video is simultaneously broadcast with streaming data might arise where a live auction channel presents a popular annual auction event, in which multiple articles are presented for sale. The broadcast contains a streaming data portion that presents the up-to-date prices of numerous articles being auctioned, with a delay of at most three seconds. In addition, the broadcast provides numerous non-streaming video portions that might provide views of an article from different angles, that might show the article in action, or that might provide close-up views of the article to enable the viewer to see special identifiable markers or features that enhance the value of the article. In addition, the broadcast could provide a live streaming video portion, broadcasted from the auction site, featuring expert interpretations and opinions.

In the above scenario, technical difficulties arise when the viewer wishes to, or possibly out of necessity, pause the broadcast and later replay one of the portions, such as a streaming or non-streaming video portion, while at the same time maintaining up-to-date display of the streaming pricing data. In prior art devices, to pause a broadcast, or streaming video portion, for later viewing requires storage of the streaming video. This has been accomplished using, for example, a cyclical buffer, wherein a user may subsequently retrieve the stored streaming or non-streaming data for purposes of replay. While the user is retrieving the stored data, at the same time, the live data stream must be continuously displayed without passing through a temporary storage cyclical buffer in order to maintain the display of the up-to-date streaming data information. Upon switching to a different article, both video and data stream displays must be switched and updated, while maintaining synchronization.

Another issue arises in the technical difficulty involved in providing the full script processing functionality required to support interactive Digital TV. As is common in web-browsers, a client-side script can be embedded within a web-page. This script has access to, and may sometime modify, the content of the viewable web-page to allow for such things as the change of the layout, or to draw boxes around focused links, etc. This significantly enriches the functionality of a page, as it renders the page interactive. By doing so, graphic menus, tooltips, automatic form filling, form input verification, etc., are enabled.

ECMAScript is the Digital TV parallel of web-page scripts. The problem is, however, the difficulty in synchronizing the access by the ECMA Script to, and subsequent display of, complex streaming and non-streaming broadcast information, such as illustrated in the above live-auction example.

Moreover, known prior art devices and systems address video storage issues, which enable providing pause-and-reply functionality. For example, U.S. Pat. No. 6,118,931 discloses a video storage method that allows for the physical locations of the disks within the array to be changed while maintaining correct alignment of the stripes making up each image frame.

U.S. Pat. No. Re 36,801 discloses a broadcast recording and playback device employing a "circular buffer" which constantly records one or more incoming audio or video program signals and a microprocessor for accessing the memory to read a playback signal from the circular buffer to display programming material delayed from its receipt by a selectable delay interval. The audio/video buffer system operates under the control of a microprocessor, which accepts commands from a remote command device or a connected host computer.

Typical prior art use of a proxy system addresses the encapsulation of data routing services. For example, U.S. Pat. No. 6,101,549 discloses a typical prior art use of proxy as a method of communicating messages across a network. A router receives an RSVP (Resource Reservation Protocol) PATH message from a sending host that is directed to a receiving host. Upon identifying the protocol of the incoming PATH message as RSVP, the router accesses a proxy look-up table to identify a proxy host acting on behalf of the receiving host. The proxy host receives the PATH message and, in response, sends a resource reservation request (RESV) message onto the network with a proxy header and directed to the predetermined port.

Known prior art that addresses quality-of-service issues focuses on workload balancing. For example, U.S. Pat. No. 6,119,174 discloses a workload distribution method that determines whether a data storage system satisfies a quality-of-service guarantee desired by a client. The quality-of-service guarantee may be a predetermined percentage of a workload being serviced by a device within a predetermined response time.

While the prior art technology does provide many advantages, it is not without several inherent disadvantages. This is particularly true in the context of providing synchronized display of streaming and non-streaming broadcast information in an efficient and streamlined manner such that the display of such broadcast information is fully utilized. Accordingly, what is needed is a system and method for assembling all of the available content information within a network environment such that any content information may be simultaneously displayed with any other content information. Specifically, what is needed is a system and method whereby fusion of data is achieved such that, upon fusion, all information components and particularly the information contained therein, may be encapsulated and stored in a common database for subsequent retrieval. Without the existence of such a database, the assembly of information cannot be streamlined and encapsulated.

SUMMARY AND OBJECTS OF THE INVENTION

The present invention extends the prior art decoupling performed by web-browsers and enables such decoupling within Digital TV browsers, such as a digital broadcast rendering device or set-top-box.

The present invention describes and claims a new system and technique or method for decoupling the interpretation of broadcast content information from the display of this information. The information may exist in any of the available types, such as audio, video, or data. In addition, the information may be received in any form, such as streaming or non-streaming, combinations of the two, or even parts thereof. The technique of decoupling alone, and without regard to whether the decoupled components (e.g., storage) constitute prior-art or not, provides the following benefits:

1. It provides an up-to-date reference database common to all subsystems that need access to the broadcast, such as Electronic Program Guides, broadcast browsers, etc;

2. It encapsulates resource allocation and utilization know-how, which is required to retrieve the broadcasted information from the database;

3. It encapsulates the know-how required to achieve synchronization between various components, such as video and data components, etc.;

4. It encapsulates the know-how of simultaneously accessing streaming and non-streaming broadcast information, and presents a single unified access interface; and 5. It eliminates the need to develop separate distinct combination-specific methods, algorithms, and code for the processing and display of different combinations of streaming and non-streaming video, audio, and data, encoded in various file formats.

The present invention does not advance the prior art by the introduction of a new storage technology, nor does the present invention advance the prior art by the introduction of a new data (e.g., message) routing technology. Moreover, the content-proxy of the present invention, may or may not use the technology described in U.S. Pat. Nos. 6,118,931, Re 36,801, 6,101,549, 6,119,174 as components.

The present invention advances the prior art and achieves the decoupling of broadcast content information by the introduction of a content proxy as a single reference data structure. The content proxy employs a hierarchical Document Object Model (DOM) that contains Program and System Information Protocol ("PSIP") data, that has been converted to an eXtendible Markup Language format using a conversion algorithm, broadcast content data, as well as content data or information about all of the hardware, software, and appliances connected within the networked environment.

The present invention's content proxy provides significant advantages over prior art devices in several ways. By way of example, and not intending to be limiting in any way, the advantages of the present invention will be realized in:

1. Scenarios that require temporary or permanent storage of content (e.g. pause and play options), smoothing broadcast interruptions, recording of selected programs, etc.

2. Scenarios that require synchronization of streaming or non-streaming data in the form of an information-service with streaming or non-streaming video, e.g., financial news broadcast, or the above live-auction scenario that requires real-time tracking of bids, or the real-time display of the results of an Olympic competition in progress combined with video replay of critical competition turning points.

3. Scenarios of content-mass-customization that requires filtering the content through user-defined preference filters, e.g., to select one advertisement out of numerous candidate advertisements.

4. Scenarios that require display of information gathered from multiple channels an multiple components connected within the network (e.g., assembly of an OmniMenu or using multiple tuners, which may or may not be part of the set-top-box, or other network component.

Therefore, it is an object of the preferred embodiment of the present invention to provide a content proxy wherein all content information within the network environment is contained.

Another object of the preferred embodiment of the present invention is to provide a single reference data structure.

A further object of the preferred embodiment of the present invention is to provide a system wherein all content information is decoupled and encapsulated into a single reference data structure.

Still a further object of the preferred embodiment of the present invention is to provide synchronization of the display of streaming and non-streaming broadcasted audio, video, and data content information.

Still another object of the preferred embodiment of the present invention is to provide a system wherein all broadcast content information and content information from networked appliances introduced within the networked environment is accessed through the content proxy.

To achieve the foregoing objects, and in accordance with the invention as embodied and broadly described herein, the present invention features a content proxy assembly for decoupling and encapsulating data, wherein the data may be stored in a single reference data structure. The single reference data structure is capable of receiving and storing communicated content information that is processed by the central processing unit such that the content proxy assembly decouples and encapsulates the content information within the single reference data structure. The storage and encapsulation procedures are described in greater detail below. To access and retrieve the information, an application program interface provides a single unified access interface to the stored and encapsulated information by which all stored information may be retrieved and routed within the network system. In a preferred embodiment, the content proxy is implemented within a Digital TV Application Software Environment framework.

The present invention further features a system for decoupling the interpretation of real-time broadcast information from the presentation of said broadcast information within a Digital TV Application Software Environment framework. This system begins with the receipt of a transport stream comprising a plurality of Digital TV Application Software Environment broadcast streams. These streams each contain software components and content information in the form of Digital Storage Media Command and Control data. This data is received into a Digital TV Application Software Environment rendering device, wherein the software components are executed and wherein the Digital Storage Media Command and Control data is collected. Upon collection of this data, it is stored in a Program and System Information Protocol data structure. Other sources of content information are also received into the system. For example, several information components may be coupled to the Digital TV Application Software Environment rendering device, each of which contain respective content information. Upon the receipt of available content information, the information is parsed using a parsing module.

Upon its parsing, the content information received is stored in a content proxy assembly embedded within the Digital TV Application Software Environment rendering device. In a preferred embodiment, the content proxy is assembled in the form of a DOM Level 2 data structure. The content proxy is capable of providing synchronized loading, decoding, and presentation of the content information, wherein the content proxy controls all content communication. The content proxy also controls the parsing module. The purpose of the content proxy of the present invention is to provide a single reference data structure created from and based upon the parsed content information and to store such information within a memory module. Using a microprocessor, this information is then decoupled and encapsulated by the content proxy. The resulting content information may be retrieved and manipulated as needed or desired based upon the uniformity within the content proxy. To extract the information, an Application Program Interface is called upon, which provides access to the single reference data structure. As such, a user may display various types of information and/or events in a synchronized manner within the Digital TV Application Software Environment network due to the direct link, through mapping, that a graphical user interface component and the Digital TV Application Software Environment rendering device have to the content proxy and the single reference data structure containing all available content information.

BRIEF DESCRIPTION OF THE DRAWINGS

In order that the manner in which the above-recited and other advantages and objects of the present invention are obtained, a more particular description of the present invention briefly described above will be rendered by reference to specific embodiments thereof which are illustrated in the accompanying drawings. As such, the present invention will become more fully apparent from the following detailed description of the preferred embodiments, the appended claims, and the accompanying drawings. Understanding that these drawings depict only typical embodiments of the invention and are, therefore, not to be considered limiting of its scope, the invention will be described and explained with additional specificity and detail through the use of the accompanying drawings in which:

FIG. 5 illustrates an example content proxy data structure formatted in eXtendible Markup Language format.

DETAILED DESCRIPTION OF THE PREFERRED EMBODIMENT(S)

Figure 1:
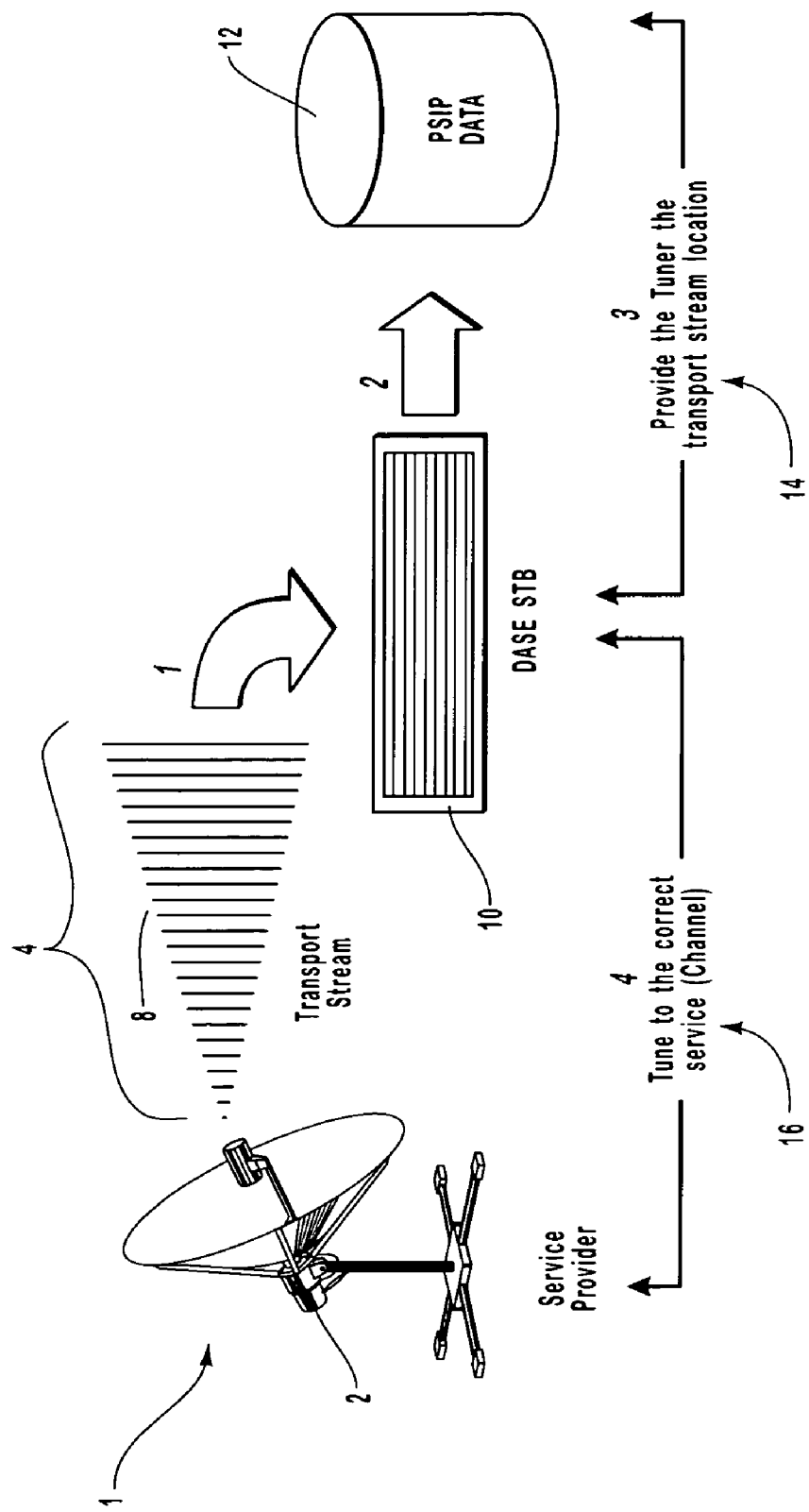
FIG. 1 illustrates a Digital TV Application Software Environment framework for interpreting broadcast information and preparing that information for display on a TV display.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, and components have not been described in detail as not to unnecessarily obscure aspects of the present invention. As such, the following more detailed description of the embodiments of the system and method of the present invention, and represented in FIGS. 1 through 9, is not intended to limit the scope of the invention, as claimed, but is merely representative of the presently preferred embodiments of the invention.

The presently preferred embodiments of the invention will be best understood by reference to the drawings, wherein like parts are designated by like numerals throughout.

The present invention describes a method and system for decoupling the TV display presentation from real-time broadcasted audio, video, and data signals, both streaming and non-streaming. Specifically, the present invention features a content proxy assembly for decoupling and encapsulating data within a DASE framework. The content proxy comprises: a) a central processing unit; b) a memory module contained within the content proxy assembly and electrically coupled to the central processing unit; c) a single reference data structure contained and stored on the memory module, wherein the single reference data structure is capable of receiving and storing communicated content information, the content information processed by the central processing unit such that the content proxy assembly decouples and encapsulates the content information within the single reference data structure; d) an application program interface for providing a single unified access interface to the encapsulated information, wherein all of the content information is accessed through the application program interface; and e) a routing module for subsequent synchronized routing of the encapsulated content information. The content proxy exists as part of a Hardware Abstraction Layer. In a preferred embodiment, the content proxy is implemented within a Digital TV Application Software Environment framework.

The present invention further features a system for decoupling the interpretation of real-time broadcast information from the presentation of the broadcast information within a Digital TV Application Software Environment framework. The system comprises: (a) a transmitter for transmitting a transport stream comprising a plurality of Digital TV Application Software Environment broadcast streams containing Digital TV Application Software Environment software components and content information in the form of Digital Storage Media Command and Control data; (b) a Digital TV Application Software Environment rendering device capable of receiving the Digital TV Application Software Environment broadcast streams and executing said Digital TV Application Software Environment software components, the Digital TV Application Software Environment rendering device also capable of collecting the Digital Storage Media Command and Control data; (c) a Program and System Information Protocol data structure wherein the content information in the form of Digital Storage Media Command and Control data collected by the Digital TV Application Software Environment rendering device is stored; (d) a microprocessor electrically coupled to the Digital TV Application Software Environment rendering device for processing the content information; (e) a memory module contained within the Digital TV Application Software Environment rendering device and electrically coupled to the microprocessor; (f) a plurality of information components coupled to the Digital TV Application Software Environment rendering device, each of the information components containing respective content information; (g) a parsing module capable of parsing the content information stored in the Program and System Information Protocol data structure; (h) a content proxy assembly existing within a Hardware Abstraction Layer and embedded within the Digital TV Application Software Environment rendering device capable of providing synchronized loading, decoding, and presentation of the content information, wherein the content proxy controls all content communication as well as the parsing module, the content proxy itself comprising: (a) a single reference data structure, stored on the memory module, created from and based upon the parsed content information, wherein the content information is processed by the microprocessor such that the content proxy assembly decouples and encapsulates the content information within the single reference data structure; and (b) a content proxy application program interface capable of providing access to the single reference data structure. The system further comprises: (i) a data manipulating device for generating user input to the Digital TV Application Software Environment framework; and (j) a visual display unit display, wherein the content information, accessed via the content proxy, may be displayed in a synchronized manner. The Digital TV Application Software Environment rendering device processes the content information contained within the single reference data structure to produce at least one layout and graphical user interface component used to make up the visible television display. The Digital TV Application Software Environment rendering device and the graphical user interface components directly link to the single reference data structure, wherein the graphical user interface component is mapped to the content information contained within the single reference data structure.

The proxy concept is applicable to the design and implementation of a Digital TV broadcast rendering device, such as a Set Top Box ("STB"). In the preferred embodiment, the Digital TV rendering device is a DASE STB. The present invention causes the STB to encapsulate the assembly of information from various sources in support of the synchronized loading and decoding of numerous combinations of streaming and non-streaming audio, video, and data, presented in various formats and in numerous combinations. Such loading and decoding often requires specific technological know-how that is not easily accessible. Often, this know-how is obtainable only through various licensing agreements, which provide the proper technology needed. These agreements may be numerous as they represent multiple devices and content information resources. Consequently, there is a need to encapsulate the required technical and business complexity in a single plug-and-play component that is easily integrated and requires a single simple licensing agreement.

The present invention utilizes a content proxy containing a Document Object Model ("DOM") data structure. A DOM data structure is an application program interface for valid HTML and well-formed XML documents. It defines the logical structures of documents and the way a document is accessed and manipulated. With a DOM data structure, documents and content can be added, modified, or deleted as needed. In addition, documents, and their structure, become easily navigable. The attractiveness of a DOM data structure comes in its ability to provide a standard programming interface that can be used in a wide variety of environments and applications. In essence, the DOM data structure is designed to be used with any programming language.

The DOM is a programming application program interface that is based upon a object structure that closely resembles the structure of the information it models. In a DOM data structure, the information has a logical structure which is very much like a tree, or several trees.

Turning now to FIG. 1, shown is the Digital TV Application Software Environment (DASE) framework 1 for interpreting broadcast information 8 and preparing for display on a TV display. Shown is a transport stream 4, which originates from a service provider 2. Transport stream 4 includes one or more broadcast streams 6, each containing broadcast information 8 comprising audio, video, and data content information. In the preferred embodiment broadcast stream 6 is a DASE broadcast stream. Each DASE broadcast stream broadcasted or received within the DASE framework 1 includes software components called DASE applications, which can be run on a client broadcast rendering device, such as a Set Top Box ("STB"). Shown in FIG. 1 is a DASE rendering device or STB 10. The DASE rendering device 10 functions as a receiver and accepts and realizes the DASE application (service component) from the Transport Stream 4. Subsequently, DASE rendering device 10 collects Digital Storage Media Command and Control ("DSMCC") data from Transport Stream 4 into the Program Storage and Information Protocol ("PSIP") data structure 12. The Program and System Information Protocol (PSIP) is a standard of the Advanced Television Systems Committee (ATSC). The ATSC Program and System Information Protocol (PSIP) is specified in standards document A/65, and provides extension to MPEG 2 for the identification of streams associated with a program and time of day information. It provides sufficient data for a program guide function, and is structured such that a broadcaster may provide data independently for his own service (in which case the receiver can assemble a guide form several sources), or in cooperation with other broadcasters. Subsequently, based on the information stored in PSIP data structure 12, DASE rendering device 10 finds the mapping of the data channel/service locator to the corresponding physical transport stream (broadcast frequency). Subsequently, DASE rendering device 10 tunes to the correct service or channel. This is essentially how different channels are tuned and viewed within a Digital TV environment.

Figure 2:
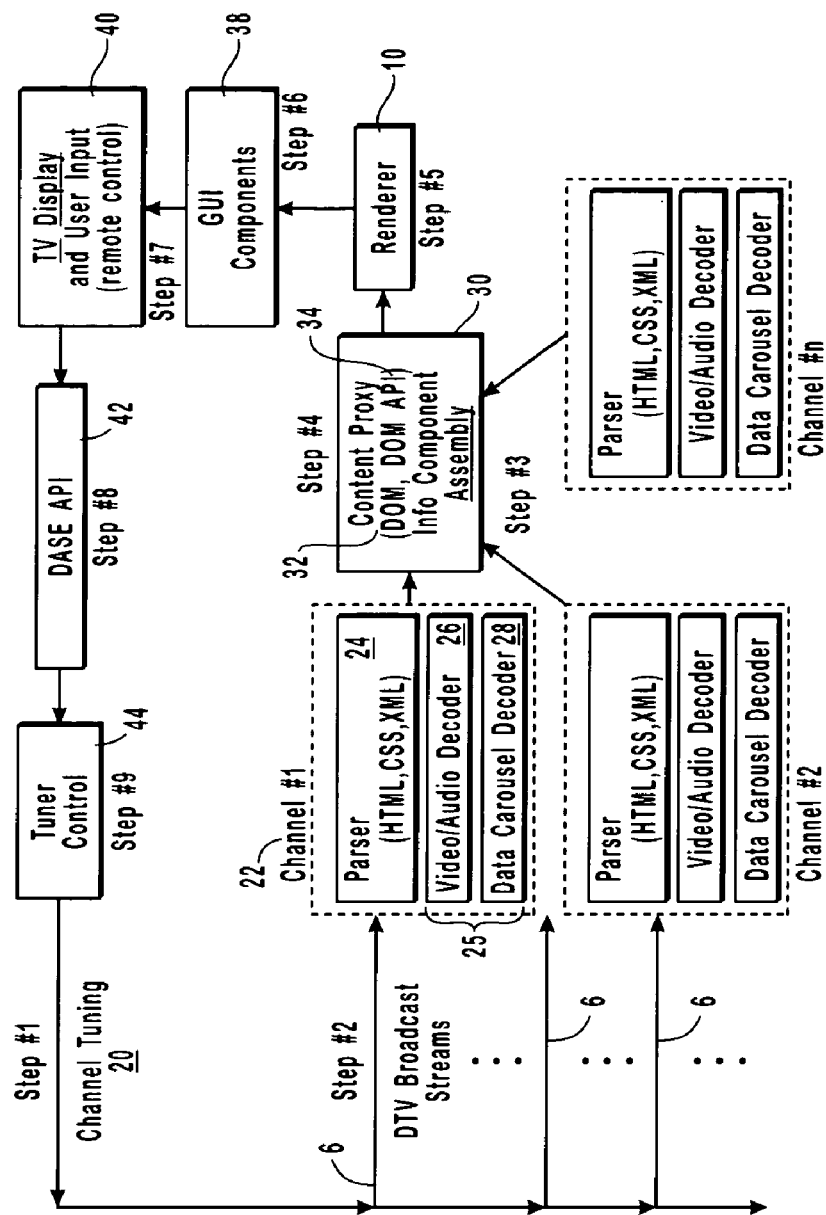
FIG. 2 illustrates the positioning of a content proxy within a digital broadcast life cycle.

FIG. 2 depicts the positioning of a content proxy 30 within the lifestyle of a broadcast stream 6, according to the present invention. Initially, in Step #1, represented as channel tunning 20, as the Digital TV is turned on, a default channel selection is performed. Next, in step #2, broadcast stream 6 from the default channel is received. Next, in step #3, broadcast stream 6 is parsed using a Parser 24 controlled by content proxy 30. Upon the parsing of broadcast stream 6, Document Object Model ("DOM") data structure 32 is constructed. In the preferred embodiment a DOM level two data structure is used. DOM data structure 32, described in greater detail below, is accessible via an Application Program Interface ("API") 34, as known in the art. Thus, according to the present invention, content proxy 30 is accessible through API 34. In the preferred embodiment, a level two DOM standard API 34 is used, as defined by http://www.w3.org/TR/DOM-Level-2, which is incorporated by reference herein. Level two DOM API 34 supports event propagation, such as data change events. Subsequently, in step #4, rendering device 10 processes DOM data structure 32 to produce the layout and Graphical User Interface ("GUI") components 38 that make up the visible TV display. Rendering device 10 and GUI components 38 do not access broadcast stream 6 directly, but rather link to the video, audio and data content information 8 stored in DOM 32 of content proxy 30. Each GUI component 38 is mapped to at least one DOM 32 object. Once GUI component 38 is readied, it is presented on the Digital TV display where various remote-control events, as controlled by the user, are collected. These events are either ignored, processed by GUI components 38 (e.g., scrolling, volume OSD, etc.), processed by either a declarative or procedural DASE application, as described in greater detail below, or used to control one or more tuning functions (e.g., channel switching or picture-in-picture). In case a DASE application processes the events, a DASE API is used to control the tuner(s) and deliver the information service requested.

Figure 3:
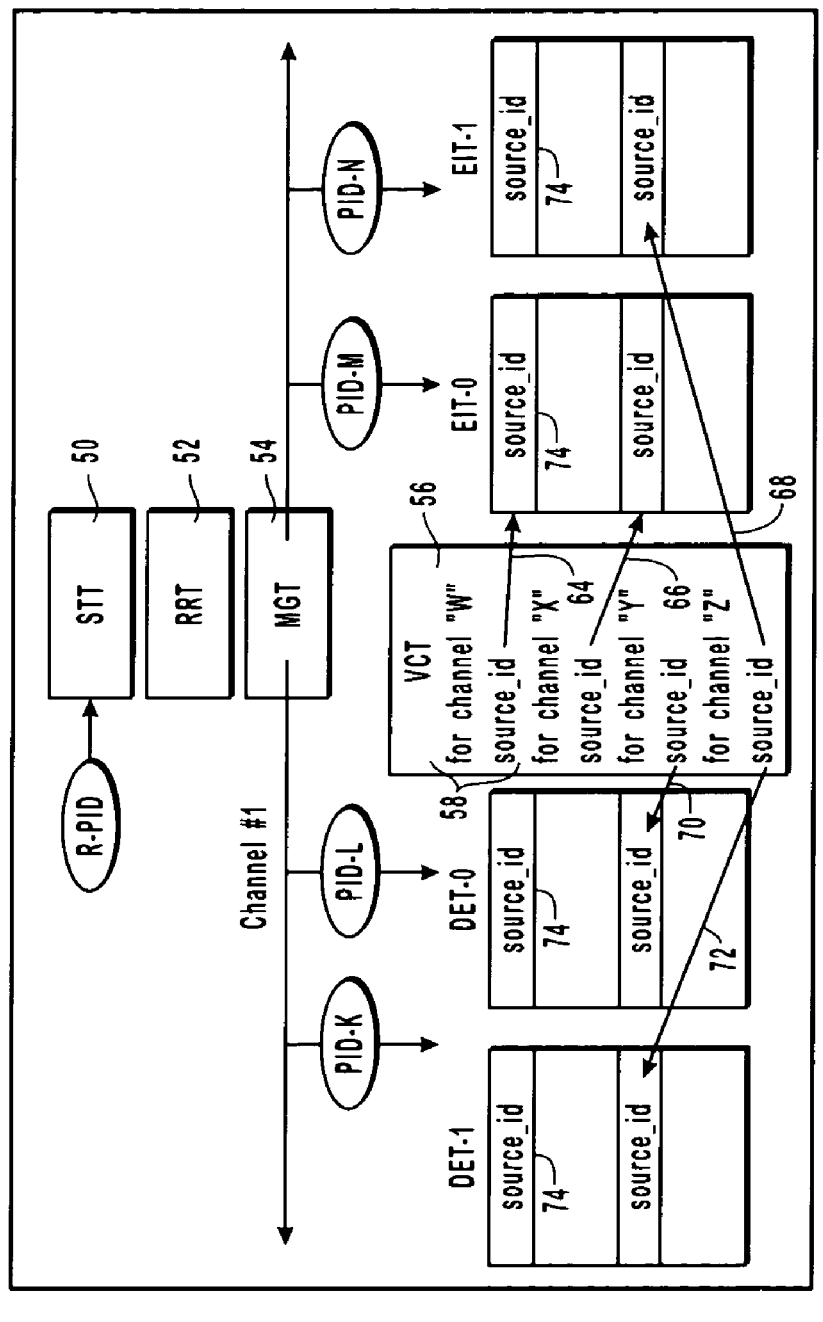
FIG. 3 illustrates the Program and System Information Protocol data structure of information as organized in hierarchal tables and prior to its being converted into an eXtendible Markup Language (XML) language format.

Content proxy 30 contains content information that originates in PSIP tables (see FIG. 3). This content information, while hierarchical, exists in a format that is incompatible with DOM data structure 32. Therefore, in order to realize the present invention the content information originating from and contained within PSIP data structure 12 must be converted into an eXtendible Markup Language ("XML") format so as to render the PSIP data accessible through level two DOM API 34. Indeed, all content information contained within DOM data structure 32 must be in an XML format. The conversion process for the PSIP content information is as follows:

1. Use Master Guide Table ("MGT") to identify table location;
2. For each table type define an object class;
3. Parse the tables, and for each parsed table construct an object instance;
4. Create a new DOM root document object;
5. For each virtual channel (pointed by a row in the Virtual Channel Table ("VCT")), add it as a child of the root document;
6. For each Event Information Table ("EIT"), add it as a child of the virtual channel table having the same source ID, and delete the source_id attribute;
7. For each ETT table, add it as a child of the EIT event information table having the same event_id, and delete both source_id and event_id attributes.

FIG. 3 illustrates PSIP data structure 12 as described in the ATSC standard document A90 from Jul. 26, 2000, (this is an upgrade of A65 to include data services). This is the input information used in the conversion algorithm presented above to convert the PSIP content information to a useable XML format. System Time Table ("STT") 50 is a time stamp table with trivial structure. The MGT is an index used for purposes of parsing broadcast stream 6 and enables correctly extracting all other tables. The Virtual Channel Table (VCT) 56 is the main table used to define the various channels. Each row in VCT 56 corresponds to a different, single virtual channel 58, whose attributes are given in corresponding virtual channel tables, shown as 64, 66, 68, 70, and 72 respectively. Collections of Event Information Tables 60 from respective single virtual channels 58, shown as 64, 66, and 68 respectively, describe program events (e.g., a movie, a broadcasted television show, etc.). Collection of Data Event Tables ("DET") 62 from respective single virtual channels 58, shown as 70 and 72 respectively, describe data service events, such as a broadcast promotion, etc., which may or may not synchronize with the video/audio events. Each event table (either EIT or DET) points to the virtual channel within which it is found via source_id attribute 74. The collection of Event Text Tables (ETT) introduces text descriptions of the events (in the EIT tables), and associates with them via the event_id attribute.

Figure 4A:
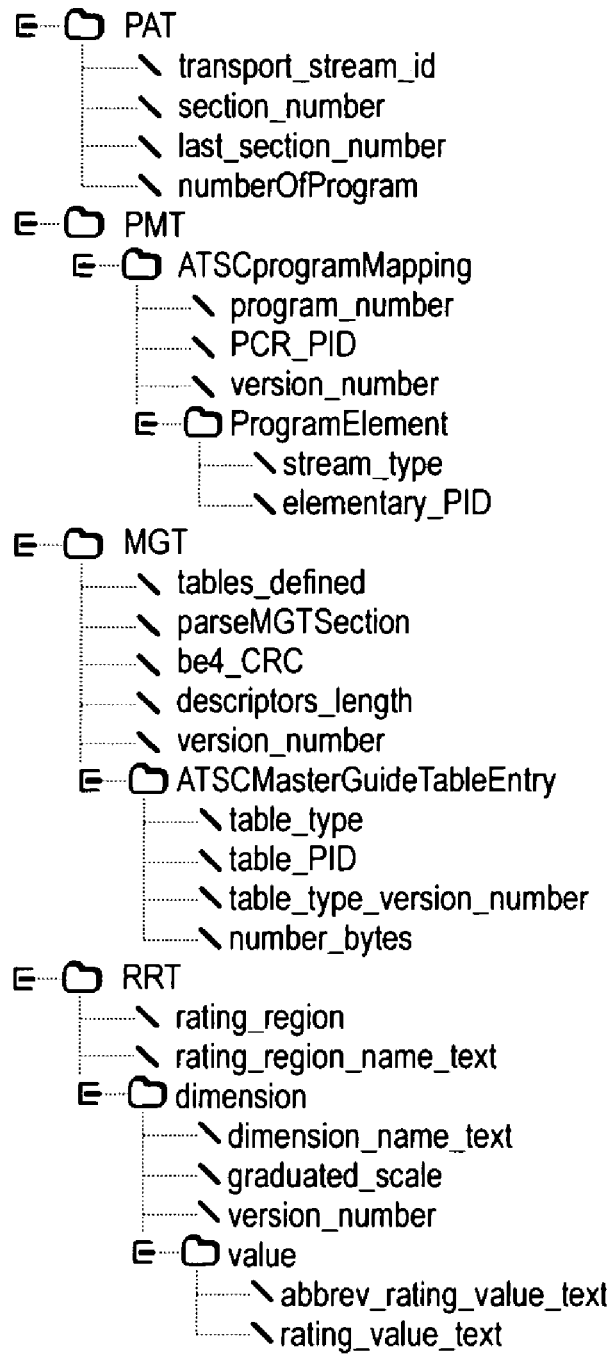
FIG. 4 illustrates the Document Object Model tree used by the content proxy to store the Program and System Information Protocol data.
Figure 4B:
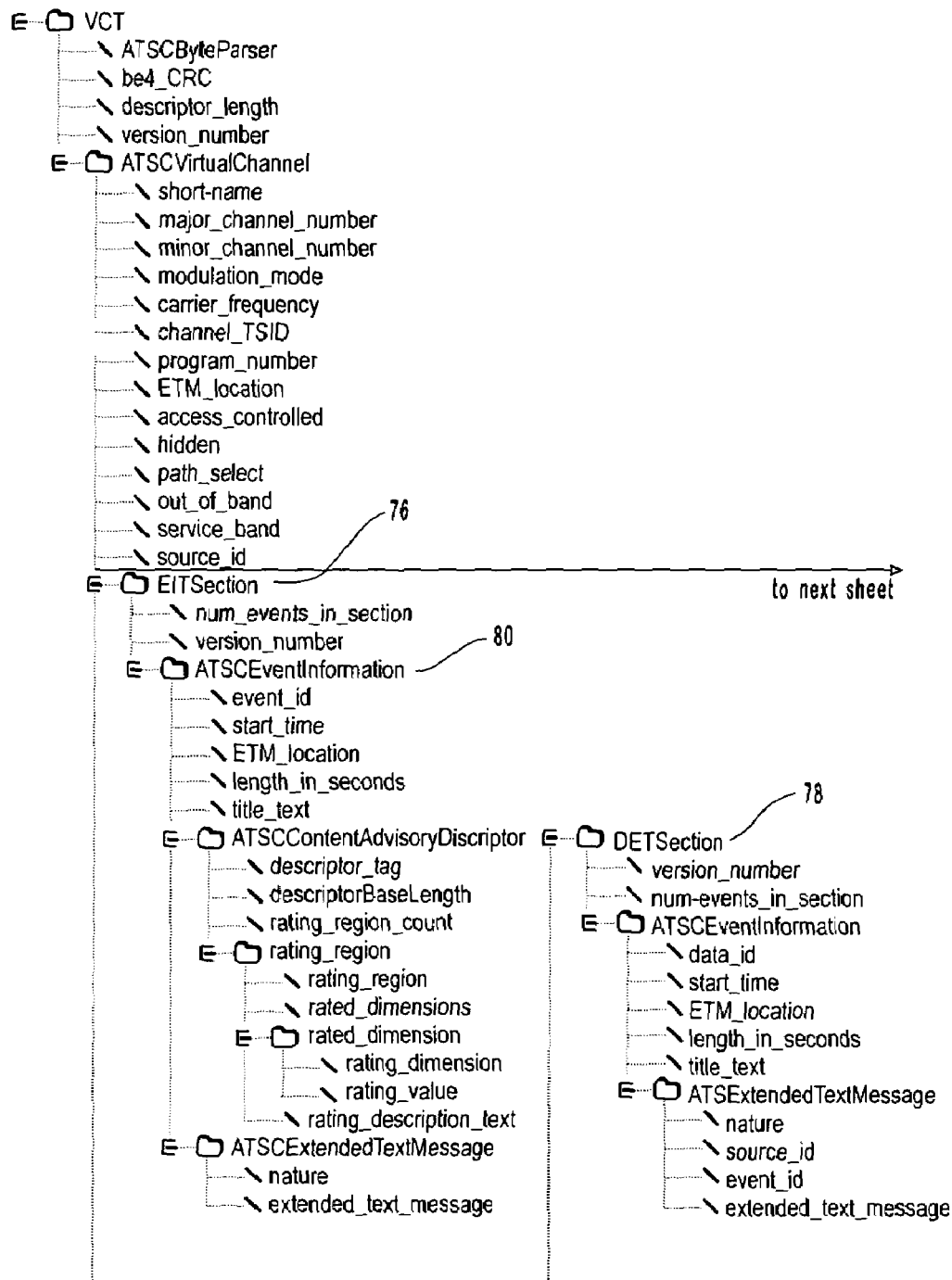
Figure 4C:
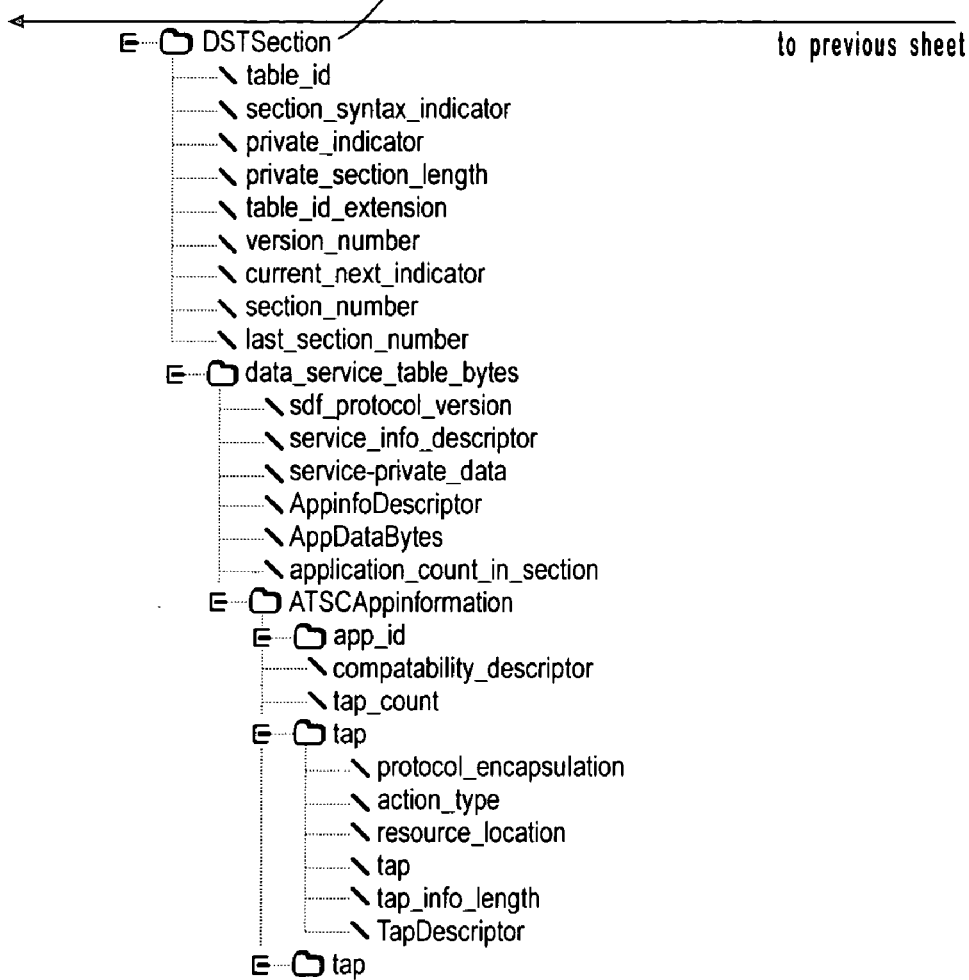

FIG. 4 illustrates the DOM tree used by the content proxy to store the PSIP data. This is the output of the conversion algorithm presented above. EIT Sections 76 and DET Sections 78 are collections of events (both video and data), all of which are submitted in a single table and reside within a single virtual channel. The hierarchical mapping of EIT Sections 76 and ATSC Event Information objects 80 is the key added value introduced by the above conversion algorithm. Instead of searching content by reference id, it is possible to find the information using a direct parent-child pointer, thus avoiding a search and simplifying the API to render DOM2 compatibility. The DST Section 79 is a collection of tables providing binding of the data service identifiers to the actual resources, e.g., data files.

Turning to FIG. 5, shown is an example content proxy database formatted in eXtendible Markup Language (XML). This data base represents a single reference data structure wherein all content information is contained. Any functions requiring or utilizing content information must access the single reference data structure, or level two DOM data structure, contained within the content proxy.

Figure 6:
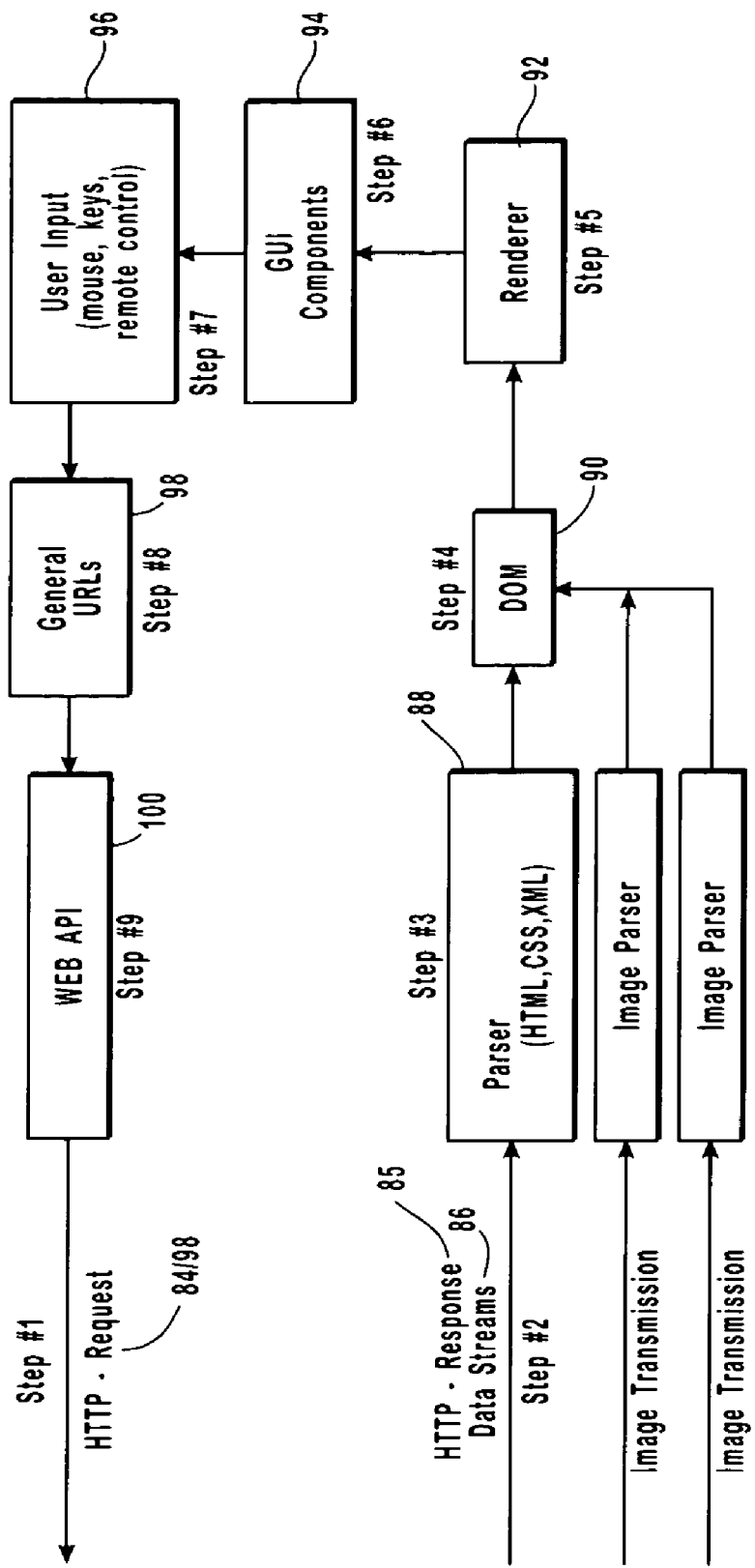
FIG. 6 illustrates a prior art Document Object Model interface as used within a web browser.

FIG. 6 illustrates a prior art use of a DOM interface within web browsers. Initially, in Step 1, an http-request 84 initiates the web page's life cycle. Next, in step 2, the http-response 85 is received and converted into a data stream 86. Next, in step 3, data stream 86 is parsed by a parser 88 and a DOM data structure 90 is constructed. Subsequently, in step 4, the rendering device 92 processes DOM data structure 90 to produce the layout and GUI components 94 that make up the visible HTML page. Rendering device 92 and GUI components 94 do not access the input data, but rather link to DOM data structure 90 directly. Once the GUI is readied, the viewer, through user input 96, can manipulate these components using the mouse and/or keyboard, to generate user input 96. User input 96 is either processed by GUI components 94 (e.g. scrolling), or causes the generation of a new http-request 98 (e.g. selection of a new link or typing of a URL). In case a new link is selected, a new URL is generated and converted into an http-request through OS Web API. Selection of a new link in this example is equivalent to selecting a new channel in the Digital TV environment of the present invention.

Figure 7:
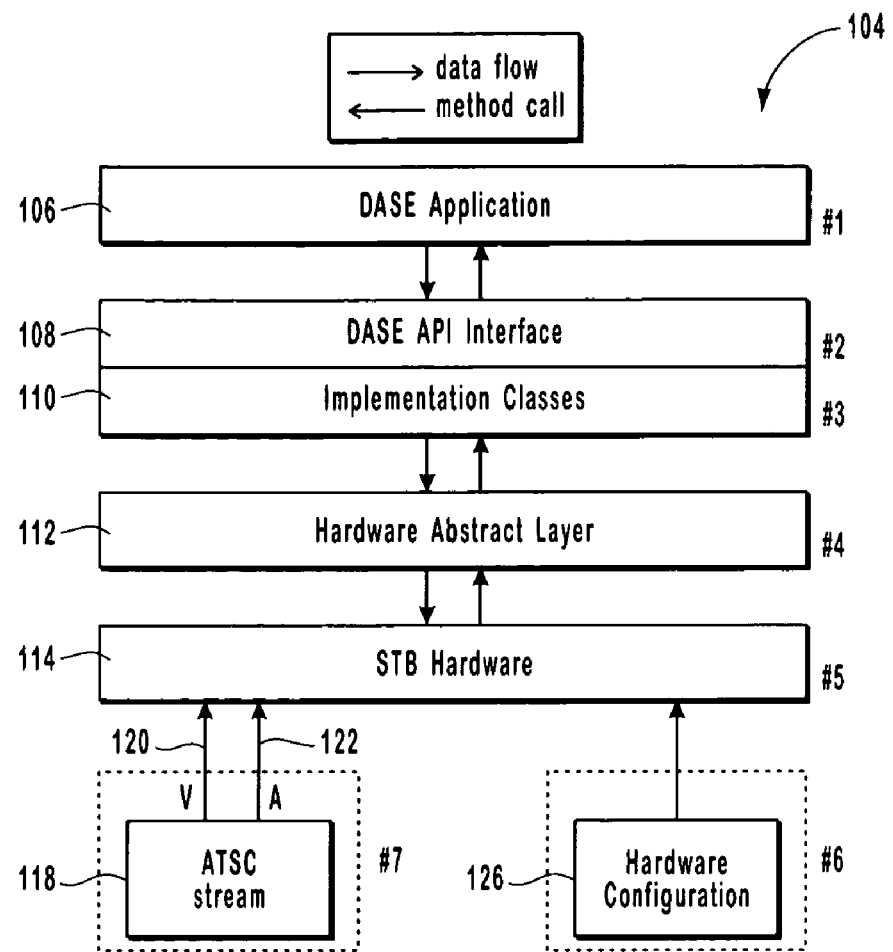
FIG. 7 illustrates a National Institute of Standards and Technology (NIST) reference implementation of DASE.

FIG. 7, shows, in general, the National Institute of Standards and Technology ("NIST") reference implementation 104 of DASE, disclosed for the purpose of teaching its relationships to the present invention. The broadcasted DASE application 106 communicates through the DASE API 108 to the DASE implementation classes 110. DASE implementation classes 110 implement the required functionality by converting calls of DASE API 108 into calls to the Hardware Abstraction Layer ("HAL") 112. HAL 112 then controls STB hardware 114 directly. STB hardware 114 is responsible for both hardware configuration 126 control and parsing the ATSC broadcast stream 118 into useable audio 122 and video 120 formats. HAL 112 is the component related to content proxy 30 of the present invention.

Figure 8:
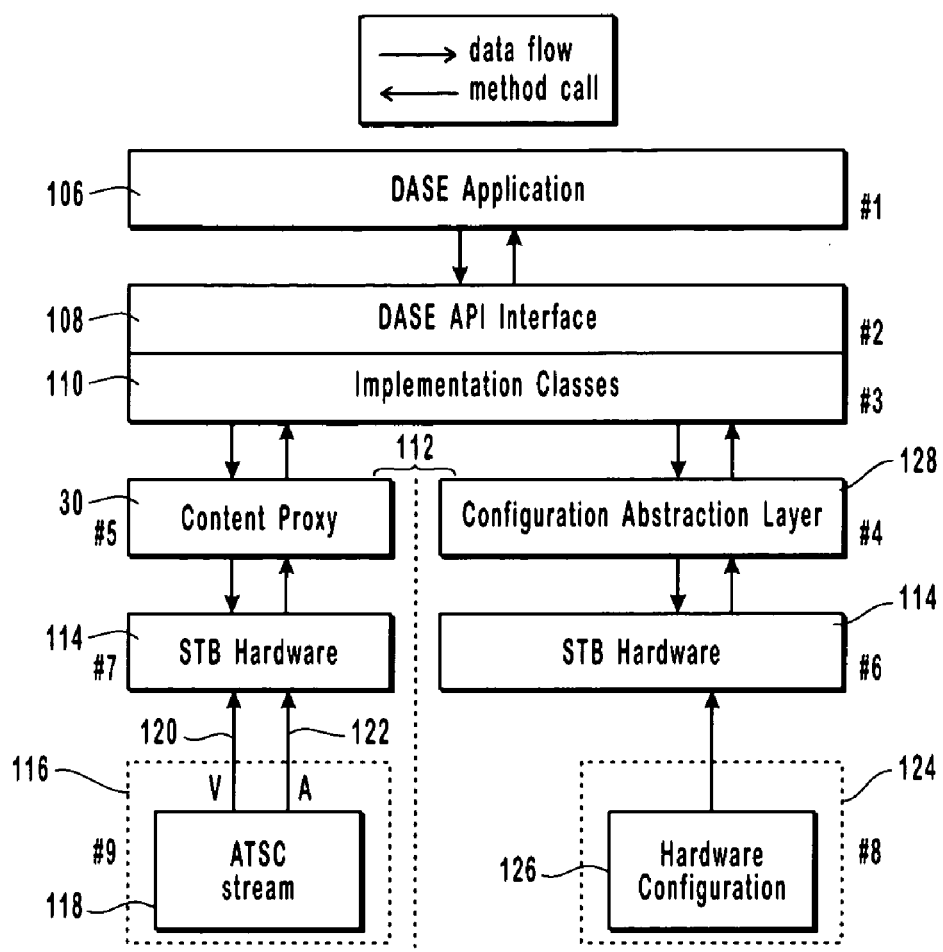
FIG. 8 illustrates the modification to the NIST architecture utilized by the present invention.

FIG. 8 illustrates the modification to the NIST architecture that the present invention requires. The HAL 112 is divided into two modules—the hardware configuration abstraction layer ("CAL") module 128 and content proxy 30. Content proxy 30 serves as a content abstraction layer between DASE implementation classes 110 and the stream-reception hardware, or STB hardware 114 (including tuners, parsers, and decoders). Content proxy 30 serves to decouple the broadcasted ATSC streams 118, and CAL 128 serves to decouple the hardware configuration in hardware configuration layer 126. Hardware configuration layer 126 is controlled through dedicated modules within the hardware layer, or STB hardware 114, which are in turn controlled by CAL 128. The ATSC broadcast streams 118, which include PSIP data, are parsed by a dedicated hardware module, or STB hardware module 114, which is in turn controlled by content proxy 30. In other words, the present invention, namely content proxy 30, relates to the broadcast content information in the same way that HAL 112 relates to hardware configuration 126 and hardware control. Content proxy 30 serves as the middleware between DASE implementation classes 110 and broadcast stream 118.

According to the present invention, the following constraints are applicable: 1) all DASE implementation classes that access content must do so solely through the content proxy API, or the level two DOM API; 2) no module in the DASE implementation layer should access content directly or indirectly through any module other than the content proxy; 3) no module in the DASE implementation layer should provide reference to content that was obtained by means other than a function call to the content proxy. In this way, the content proxy serves to encapsulate all available content information of all appliances and broadcast streams that are to be introduced and/or networked within the Digital TV environment.

Figure 9:
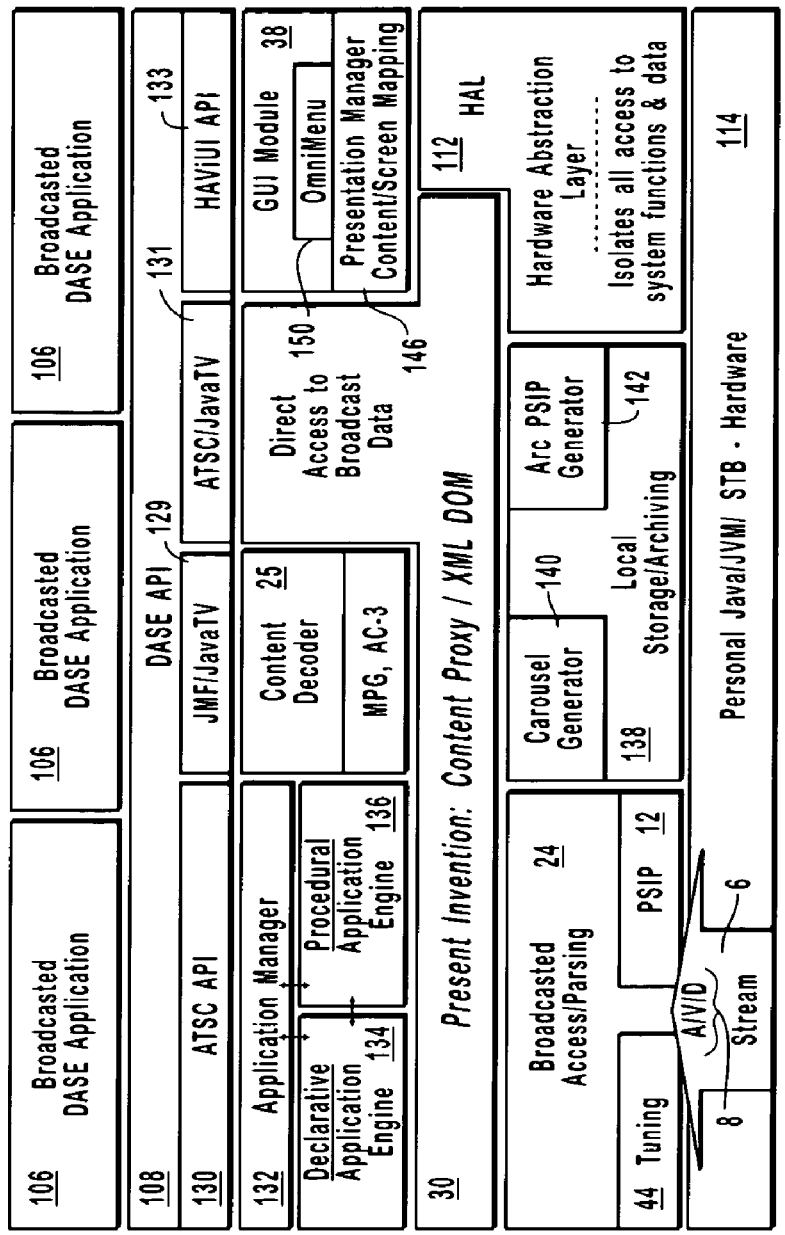
FIG. 9 illustrates the implementation of the DASE Application Program Interface according to the present invention.

FIG. 9 shows DASE API 108, which is implemented by classes that are divided into five different modules: 1) Declarative Application Engine 134; 2) Procedural Application Engine 136; 3) content decoder 25; 4) content proxy 30; and 5) GUI implementation module 38. Both declarative 134 and procedural 136 application engines receive their function calls from an application manager 132. GUI module 38 contains a presentation manager 146, responsible for, layout management, and an OmniMenu 150. Declarative 134 and Procedural 136 application engines control content decoders 25, such as play, pause, forward, rewind, etc., but do not exchange content with them, because the present invention requires that all content communication is performed against content proxy 30. Content proxy 30 is capable of receiving broadcast content information 8 from broadcast stream 6. Broadcast stream 6, containing content information 6, is shown as being parsed by a parsing module 24 to include tuning data 44 or PSIP data 12. In addition, content proxy 30 is capable of directly receiving local storage/archiving information 138 generated by carousel generator 140 and Arc PSIP generator 142. Content proxy 30 is also capable of communicating with HAL 112, wherein all access to system functions and data is isolated to content proxy 30. HAL 112 is also shown to communicate with GUI Module 38 either directly or through a presentation manager 146 or OmniMenu 150. In either event, GUI 38 directly receives information from HAL 112 or content proxy 30. DASE API 108 is also shown, and functions as described above in relation to broadcasted DASE Applications 106. DASE API contains various types of interfaces, shown as 129, 130, 131, and 133 respectively.

Prior art does not allow Declarative Applications (i.e. XDML web pages) to have access to DASE services. The present invention overcomes this difficulty by providing a DOM infrastructure, as well as an API, that enables ECMA Script access to these services. This enables access to Digital TV broadcast content by means of a standard API in a fashion fully compatible with prior art technology. Since the content proxy encapsulates the synchronization, the content retrieved is fully synchronized. As a result, the ECMA Script to complex streaming and non-streaming broadcast information is enabled. In addition, the subsequent display of the complex streaming and non-streaming broadcast information is also enabled, such as illustrated in the above live auction example.

Alternatively, the present invention can be used to provide pause and replay capabilities for streaming video portions by means of a DOM implementation of a cyclical buffer. The display of the replay video is performed after extracting it from the content proxy by means of an API, such as a level two DOM API, as described above. Upon switching to a different channel, different video and data service are extracted from the content proxy without regard to their type.

The present invention can also be used to serve home appliances, such as a Digital TV web proxy server, for purposes of catching web content, including video streaming, which is typically very slow if not drawn from a cache. It can also be embodied within non-TV appliances, such as car navigational systems, refrigerators, audio systems, home security systems, HVAC systems, toys, etc.

Other embodiments include various video conferencing systems, as well as security systems, both closed and open loop systems where the content proxy is used to encapsulate a cyclical digital storage of video for purposes of ad-hoc replay of selected content from selected cameras. Other possibilities include embedding a content proxy and content proxy interface within devices that provide video-over-IP capabilities.

Finally, note that it is possible to implement the content proxy data structure and the content proxy interface my means different from level two DOM and level two DOM API respectively.

The present invention also features a method for providing synchronized presentation of streaming and non-streaming data, wherein the method comprises the steps of: (a) obtaining content information from a broadcast stream having a broadcast life cycle, with the content information comprising streaming and non-streaming data; (b) implementing a content proxy within the broadcast life cycle, the content proxy comprising a single reference data structure capable of storing, encapsulating and synchronizing the presentation of the streaming and non-streaming data; (c) accessing the content information stored withing the content proxy through a content proxy application interface; and (d) presenting the content information to a graphical user interface.

The present invention further features a computer readable medium containing a single reference data structure for decoupling the interpretation of real-time broadcast information from the presentation of the broadcast information, the real-time broadcast information comprising streaming and non-streaming data, wherein the broadcast information is converted and stored on a content proxy containing the single reference data structure, the single reference data structure encapsulating and allowing synchronized presentation of the broadcast information to a graphical user interface.

The present invention still further features a method in a computer system for displaying synchronized real-time broadcast information. The method comprising the steps of: (a) storing content information received from a broadcast stream in a content proxy, the content proxy comprising a single reference data structure, and the content information comprising streaming and non-streaming data and being decoupled from the broadcast stream and encapsulated within the content proxy; (b) accessing the content proxy through an application interface; (c) creating a graphical user interface based on the content information; (d) displaying the streaming data on the graphical user interface, the streaming data being processed by the content proxy and accessed through the application program interface; and (e) displaying the non-streaming data with the streaming data in a synchronized manner, the non-streaming data being processed by the content proxy and accessed through the application interface via the application program interface.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

The invention claimed is:

1. A system configured for decoupling and encapsulating television broadcast content information in a digital television environment, the system comprising:
   (a) a central processing unit;
   (b) a hardware abstraction layer processed by said central processing unit, said hardware abstraction layer divided into a plurality of modules including (i) a hardware configuration abstraction layer configured to decouple a hardware configuration and (ii) a content proxy configured to decouple a television broadcast stream;
   (c) a memory module electrically coupled to said central processing unit;
   (d) a single reference data structure contained and stored on said memory module, said single reference data structure capable of receiving and storing said television broadcast content information, said television broadcast content information processed by said central processing unit such that said content proxy assembly decouples said television broadcast stream and encapsulates said television content information within said single reference data structure;
   (e) an application program interface for providing a single unified access interface to said encapsulated television content information, wherein all of said television content information is accessed through said application program interface; and
   (f) a routing module for subsequent synchronized routing of said encapsulated content information.

2. The system of claim 1, wherein said application program interface is a Document Object Model Application Program Interface.

3. The system of claim 1, wherein said single reference data structure of said content proxy comprises a hierarchal Document Object Model.

4. The system of claim 3, wherein said Document Object Model is a level two Document Object Model.

5. The system of claim 1, wherein said television broadcast content information comprises Program and System Information Protocol data converted to an eXtendable Markup Language format.

6. The system of claim 1, wherein said hardware configuration abstraction layer decouples and encapsulates hardware specific information.

7. The system of claim 1, wherein said content proxy is configured to encapsulate appliance specific information.

8. The system of claim 5, wherein said television broadcast content information comprises European Computer Manufacturers Association Scripting data.

9. The system of claim 5, wherein said television broadcast content information comprises resource allocation data and information.

10. The system of claim 5, wherein said television broadcast content information comprises utilization data and information.

11. The system of claim 5, wherein said television broadcast content information comprises data and information on simultaneously accessing various combinations of said television broadcast content information stored within said content proxy.

12. The system of claim 5, wherein said television broadcast content information originates from information components coupled to said content proxy.

13. The system of claim 5, wherein said television broadcast content information originates from a transport stream.

14. The system of claim 13, wherein said transport stream contains a broadcast stream having broadcast information.

15. The system of claim 14, wherein said broadcast stream is a Digital TV Application Software Environment broadcast stream.

16. The system of claim 15, wherein said broadcast information comprises streaming video data.

17. The system of claim 15, wherein said broadcast information comprises streaming audio signals.

18. The system of claim 15, wherein said broadcast information comprises streaming data signals.

19. The system of claim 15, wherein said broadcast information comprises non-streaming video signals.

20. The system of claim 15, wherein said broadcast information comprises non-streaming audio signals.

21. The system of claim 15, wherein said broadcast information comprises non-streaming data signals.

22. The system of claim 1, wherein said content proxy eliminates the need to develop separate and distinct combination-specific methods, algorithms, and code for the processing and display to different combinations of said streaming and said non-streaming video, audio, and data encoded in differing formats.

23. The system of claim 1, wherein said content proxy assembly is implemented within a Digital TV Application Software Environment that includes a Digital TV Application Software Environment rendering device having said content proxy embedded therein.

24. A system for decoupling the interpretation of real-time broadcast information from the presentation of said broadcast information within a Digital TV Application Software Environment framework, said system comprising:
   (a) a transmitter for transmitting a transport stream comprising a plurality of Digital TV Application Software Environment broadcast streams containing Digital TV Application Software Environment software components and content information in the form of Digital Storage Media Command and Control data;

(b) a Digital TV Application Software Environment rendering device capable of receiving said Digital TV Application Software Environment broadcast streams and executing said Digital TV Application Software Environment software components, said Digital TV Application Software Environment rendering device also capable of collecting said Digital Storage Media Command and Control data;

(c) a Program and System Information Protocol data structure wherein said content information in the form of Digital Storage Media Command and Control data collected by said Digital TV Application Software Environment rendering device is stored;

(d) a microprocessor electrically coupled to said Digital TV Application Software Environment rendering device for processing said content information;

(e) a hardware abstraction layer processed by said microprocessor, said hardware abstraction layer divided into a plurality of modules including (i) a hardware configuration abstraction layer configured to decouple a hardware configuration and (ii) a content proxy configured to decouple said broadcast streams;

(f) a memory module electrically coupled to said microprocessor;

(g) a plurality of information components coupled to said Digital TV Application Software Environment rendering device, each of said information components containing respective content information;

(h) a parsing module capable of parsing said content information stored in said Program and System Information Protocol data structure;

(i) said content proxy assembly embedded within said Digital TV Application Software Environment rendering device and being capable of providing synchronized loading, decoding, and presentation of said content information, wherein said content proxy controls all content communication, said content proxy controlling said parsing module, said content proxy comprising:

i) a single reference data structure created from and based upon said parsed content information and stored on said memory module, said content information processed by said microprocessor such that said content proxy assembly decouples and encapsulates said content information within said single reference data structure;

ii) content proxy application program interface capable of providing access to said single reference data structure;

(j) a data manipulating device for generating user input to said Digital TV Application Software Environment framework; and (k) a visual display unit, wherein said content information may be displayed in a synchronized manner, said content information accessed via said content proxy; and wherein said Digital TV Application Software Environment rendering device processes said content information contained within said single reference data structure to produce at least one layout and graphical user interface component used to make up the visible television display, said Digital TV Application Software Environment rendering device and said graphical user interface components directly linking to said single reference data structure, wherein said graphical user interface component is mapped to said content information contained within said single reference data structure.

25. The system of claim 24, further comprising full script processing to support a user interactive environment, said full script processing accessing said content proxy directly.

26. The system of claim 25, wherein said content proxy facilitates synchronized access of said full script processing with said broadcast information.

27. The system of claim 25, wherein said full script processing utilizes ECMAScript technology.

28. The system of claim 24, wherein said reference data structure of said content proxy comprises a hierarchal Document Object Model data structure.

29. The system of claim 28, wherein said Document Object Model data structure contains said content information as extracted from said Program and System Information Protocol data structure.

30. The system of claim 29, wherein said content information is converted into an eXtendable Markup Language format prior to being extracted from said Program and System Information Protocol data structure and input into said Document Object Model data structure.

31. The system of claim 28, wherein said Document Object Model data structure contains broadcast content information.

32. The system of claim 28, wherein said Document Object Model data structure contains information about the hardware coupled to and existing within said Digital TV Application Software Environment framework.

33. The system of claim 28, wherein said Document Object Model contains information about the appliances coupled to and existing within said Digital TV Application Software Environment framework.

34. The system of claim 24, wherein said single reference data structure is updated when new content information is received from said Digital TV Application software Environment broadcast stream.

35. The system of claim 24, wherein a portion of said single reference data structure is cleared when the power is turned off.

36. The system of claim 24, further comprising a Document Object Model Application Program Interface.

37. The system of claim 36, wherein said Document Object Model Application Program Interface is a Document Object Model Level Two Application Program Interface.

38. The system of claim 24, wherein said user input is processed by said graphical user interface components.

39. The system of claim 24, wherein said user input is processed by a Digital TV Application Software Environment application.

40. The system of claim 39, wherein a Digital TV Application Software Environment application program interface is used to control at least one tuner when said user input is processed by said Digital TV Application Software Environment application.

41. The system of claim 24, wherein said user input includes controlling at least one tuner.

42. The system of claim 24, wherein said broadcast information contains streaming audio signals.

43. The system of claim 24, wherein said broadcast information contains streaming video signals.

44. The system of claim 24, wherein said broadcast information contains streaming data signals.

45. The system of claim 24, wherein said broadcast information contains nonstreaming audio signals.

46. The system of claim 24, wherein said broadcast information contains non-streaming video signals.

47. The system of claim 24, wherein said broadcast information contains non-streaming data signals.

48. The system of claim 24, wherein said content proxy eliminates the need to develop separate and distinct combination-specific methods, algorithms, and code for the processing and display of different combinations of streaming and non-streaming video, audio, and data encoded in differing formats.

49. The system of claim 24, wherein said encapsulated data includes all resource allocation and utilization data of each of said plurality of information components.

50. The system of claim 24, wherein said encapsulated data includes data required to synchronize said plurality of information components.

51. The system of claim 24, wherein said encapsulated data includes data enabling simultaneous access of streaming and non-streaming broadcast information.

52. A method for decoupling the interpretation of real-time broadcast information from the presentation of said broadcast information within a Digital TV environment, the method comprising:
- (a) providing a broadcast receiving system with a hardware abstraction layer divided into a plurality of modules, including (i) a hardware configuration abstraction layer to decouple a hardware configuration and (ii) a content proxy configured to decouple a Digital TV Application Software Environment broadcast stream;
- (b) selecting said Digital TV Application Software Environment broadcast stream received from a transmitter of said broadcast receiving system, said broadcast stream comprising Digital TV Application Software Environment software components and content information in the form of and Digital Storage Media Command and Control data;
- (c) implementing a Digital TV Application Software Environment rendering device within said broadcast receiving system to receive said Digital TV Application Software Environment broadcast stream and execute said Digital TV Application Software Environment software components, said Digital TV Application Software Environment rendering device also capable of collecting said Digital Storage Media Command and Control data;
- (d) storing said content information in a Program and System Information Protocol data structure;
- (e) using a microprocessor electrically coupled to said Digital TV Application Software Environment rendering device to process said content information;
- (f) using a memory module contained within said Digital TV Application Software Environment rendering device and electrically coupling said memory module to said microprocessor to selectively preserve information;
- (g) using a parsing module to parse said content information stored in said Program and System Information Protocol data structure, said parsing module converting said content information into an eXtendable Markup Language format;
- (h) using said content proxy to encapsulate said content information such that said content proxy provides synchronized loading, decoding, and presentation of said content information, wherein said content proxy controls all of said content information communication, and wherein said content proxy controls said parsing module;
- (i) processing said content information contained within a single reference data structure using said Digital TV Application Software Environment rendering device to produce layout and graphical user interface components used to make up the visible television display, said Digital TV Application Software Environment rendering device and said graphical user interface components linking directly to said single reference data structure, wherein said graphical user interface components are mapped to said content information contained within said single reference data structure;
- (j) generating user input through a data manipulating device, said data manipulation device providing a user control of and interaction with said Digital TV environment; and
- (k) displaying said content information, in a synchronized manner, on a visual display unit, said content information accessed via said content proxy.

53. The method of claim 52, further including the step of selecting a different Digital TV Application Software Environment broadcast stream received from a transmitter and into said broadcast receiving system.

54. The method of claim 52, further comprising the step of providing full script processing to support a user interactive environment, said full script processing directly accessing said content proxy.

55. The method of claim 54, wherein said content proxy facilitates synchronized access of said full script processing with said broadcast information.

56. The method of claim 52, wherein said reference data structure of said content proxy comprises a hierarchal Document Object Model.

57. The method of claim of claim 56, wherein said Document Object Model includes content information from said Program and System Information Protocol.

58. The method of claim of claim 56, wherein said Document Object Model includes content information from said broadcast stream.

59. The method of claim of claim 56, wherein said Document Object Model includes content information about any hardware coupled to said rendering device.

60. The method of claim of claim 56, wherein said Document Object Model includes content information about any appliances coupled to said rendering device.

61. The method of claim 52, further comprising the step of implementing a Document Object Model Application Program Interface.

62. The method of claim 61, wherein said Document Object Model Application Program Interface is a Document Object Model level two Application Program Interface.

63. The method of claim 52, wherein a portion of said single reference data structure is refreshed upon receipt of a new broadcast stream.

64. The method of claim 63, wherein a portion of said reference data structure is cleared when said power is turned off.

65. The method of claim 52, further including coupling a plurality of information components to said rendering device, said information components having content information specific to each respective component.

66. The method of claim 52, wherein said user input is processed by said graphical user interface.

67. The method of claim 52, wherein said user input is processed by a Digital TV Application Software Environment application.

68. The method of claim 67, wherein said Digital TV Application Software Environment application comprises both declarative and procedural applications.

69. The method of claim 68, wherein a Digital TV Application Software Environment application program interface is used to control at least one tuner provided said Digital TV Application Software Environment application is used to process said user input.

70. The method of claim 52, wherein said step of generating user input includes controlling at least one tuner.

71. The method of claim 52, further including the step of connecting a plurality of information components to said Digital TV Application Software Environment rendering device, each of said information components containing respective content information.

72. A method for providing synchronized presentation of streaming and non-said method comprising:
  (a) dividing an abstraction layer of a digital television rendering system into a plurality of modules, including (i) a hardware configuration abstraction layer that decouples a hardware configuration and (ii) a content proxy that decouples a television broadcast stream;
  (b) obtaining content information from said television broadcast stream, said content information comprising streaming and non-streaming data, said television broadcast stream having a broadcast life cycle;
  (c) implementing said content proxy within said broadcast life cycle, said content proxy comprising a single reference data structure capable of storing, encapsulating and synchronizing the presentation of said streaming and non-streaming data;
  (d) accessing said content information stored withing said through a content proxy application interface; and
  (e) presenting said content information to a graphical user interface.

73. A method for displaying synchronized, real-time television broadcast information, said method comprising:
  (a) dividing an abstraction layer of a digital television rendering system into a plurality of modules, including (i) a hardware configuration abstraction layer that decouples a hardware configuration and (ii) a content proxy that decouples a television broadcast stream;
  (b) storing content information received from said broadcast stream in said content proxy, said content proxy comprising a single reference data structure, said content information comprising streaming and non-streaming data and being decoupled from said broadcast stream and encapsulated within said content proxy;
  (c) accessing said content proxy though an application interface;
  (d) creating a graphical user interface based on said content information;
  (e) displaying said streaming data on said graphical user interface, said streaming data being processed by said content proxy and accessed through said application program interface; and
  (f) displaying said non-streaming data with said streaming data in a synchronized manner, said non-streaming data being processed by said content proxy and accessed through said application interface via said application program interface.

* * * * *